United States Patent

Ponticos

[11] Patent Number: 6,035,067
[45] Date of Patent: Mar. 7, 2000

[54] APPARATUS FOR TRACKING OBJECTS IN VIDEO SEQUENCES AND METHODS THEREFOR

[75] Inventor: Constantine Ponticos, London, United Kingdom

[73] Assignee: U.S. Philips Corporation, New York, N.Y.

[21] Appl. No.: 08/935,252

[22] Filed: Sep. 22, 1997

Related U.S. Application Data

[63] Continuation of application No. 08/362,422, filed as application No. PCT/GB94/00921, Apr. 29, 1994, abandoned.

[30] Foreign Application Priority Data

Apr. 30, 1993 [GB] United Kingdom ............ 9308952

[51] Int. Cl.[7] ............................................... G06K 9/68
[52] U.S. Cl. ............................................... 382/226
[58] Field of Search ............................ 382/100, 103, 382/107, 115, 173, 174, 270, 274, 275, 278, 236, 199; 348/154, 169, 143, 152, 153, 415, 416, 409

[56] References Cited

U.S. PATENT DOCUMENTS

| | | | |
|---|---|---|---|
| 4,183,013 | 1/1980 | Agrawala et al. | 382/199 |
| 4,468,704 | 8/1984 | Stoffel et al. | 382/273 |
| 4,703,512 | 10/1987 | Saka et al. | 382/199 |
| 4,742,552 | 5/1988 | Andrews | 382/303 |
| 4,783,829 | 11/1988 | Miyakawa et al. | 382/199 |
| 4,868,871 | 9/1989 | Watson, III | 382/103 |

(List continued on next page.)

FOREIGN PATENT DOCUMENTS

| | | |
|---|---|---|
| 0225729 | 6/1987 | European Pat. Off. . |
| 0474304 | 3/1992 | European Pat. Off. . |
| 8809101 | 11/1988 | WIPO . |
| 9203801 | 3/1992 | WIPO . |
| 9302529 | 2/1993 | WIPO . |

OTHER PUBLICATIONS

Pratt, Digital Image Processing, 1979, p. 527.

(List continued on next page.)

Primary Examiner—Jose L. Couso
Attorney, Agent, or Firm—Laurice E. Gathman

[57] ABSTRACT

A method of image processing for tracking a subject in a sequence of image frames using predefined criteria for classifying image regions as potentially being part of the tracked subject includes steps for obtaining, for a first image frame, a record of an image region previously designated as containing the tracked subject, classifying image regions of a second image frame in accordance with the defined criteria to thereby generate classified image regions, and updating the designated image region associated with the second image frame with reference to both the classified image regions in the second image frame and the previously designated image region in the first image frame. Tracking the subject though a sequence of image frames permits processing the portion of the image frames corresponding to the subject at a relatively high resolution while processing the background at a relatively low resolution so as to maximize image processing for regions containing the subject. A videophone device, a motion picture signal, and a motion picture recording manufactured using the image processing method and a data processing device are also described.

52 Claims, 9 Drawing Sheets

U.S. PATENT DOCUMENTS

| | | | |
|---|---|---|---|
| 4,937,878 | 6/1990 | Lo et al. | 382/103 |
| 4,991,009 | 2/1991 | Suzuki et al. | 348/415 |
| 4,996,594 | 2/1991 | Murayama | 348/409 |
| 5,034,986 | 7/1991 | Karmann et al. | 382/107 |
| 5,059,796 | 10/1991 | Nakamura | 382/103 |
| 5,109,425 | 4/1992 | Lawton | 382/153 |
| 5,243,418 | 9/1993 | Kuno et al. | 382/103 |
| 5,285,273 | 2/1994 | James et al. | 382/103 |
| 5,341,142 | 8/1994 | Reis et al. | 342/64 |
| 5,420,638 | 5/1995 | Riglet et al. | 348/409 |
| 5,473,378 | 12/1995 | Tamitani | 348/416 |
| 5,631,975 | 5/1997 | Riglet et al. | 382/173 |

OTHER PUBLICATIONS

Pao, Adoptive Pattern Recognition and Neural Networks, 1989, pp. 7–10.

R. Sedgewick, "Algorithms", Addison–Wesley Publishing Co., London, Chapter 25, pp. 326–330.

W. Long et al, "Stationary Background Generation: An Alternative To The Difference Of Two Images", Pattern Recognition, vol. 23, No. 12, 1990, pp. 1351–1359.

R. Jain et al, "Segmentation through the Detection of Changes Due to Motion", Computer Graphics and Image Processing, vol. 11, No. 1, Sep. 1979, pp. 13–34.

$P_K =$ [matrix as shown in figure]

APPARATUS FOR TRACKING OBJECTS IN VIDEO SEQUENCES AND METHODS THEREFOR

This is a continuation of application Ser. No. 08/362,422, filed Jan. 20, 1995 now abandoned which is a 371 of PCT/GB94/00921 filed Apr. 29, 1994.

BACKGROUND OF THE INVENTION

The invention relates to methods and apparatuses for tracking subjects in motion picture sequences, to apparatuses for performing such methods and to related methods and apparatuses. The invention may be applied for example in videophones, or in the digital encoding of general motion picture sequences, for example for publishing motion pictures on optical Compact Discs.

The improvement in the subjective image quality of videophone images that can be achieved by enhancing the area around the user's face, at the expense of the rest of the frame, has been known for some time and successful algorithms to accomplish this task have already been developed. Implementation of such algorithms on commercial hardware, however, has been delayed by the computational complexity. Most successful algorithms rely on techniques for edge detection and operate at pixel rates requiring much high speed hardware.

Some algorithms operate on frame differences for motion detection, a much simpler technique, but they have, however, had problems in the past with changes in overall lighting intensity, movement in the background (a common occurrence in office environments), or even non movement of the user.

Other algorithms exploit the fact that the video compression codec divides the image into blocks (typically of 16×16 pixels) for coding, and extracts a few parameters from each. By operating on these much smaller arrays of parameters they can run at a lower rate and are much less demanding computationally.

SUMMARY OF THE INVENTION

The object of the invention is to provide techniques which can detect movement on a block or pixel level, but which address the above problems through a process that discriminates between the user of the videophone and other moving objects. The techniques are also suitable for general subject tracking, when colour, or some attribute other than movement, can be used as the basis for tracking.

In a first particular aspect, the invention provides a method of image processing for tracking a subject in a sequence of image frames, the method comprising:

(a) defining criteria for classifying image regions as being potentially part of the subject to be tracked;

(b) obtaining for each new image frame a record of an image region previously designated as containing the subject;

(c) classifying regions of each new image frame in accordance with the defined criteria; and (d) updating the designated region with reference to both the classification of regions in the new frame and the previously designated region.

In embodiments of the invention, on the assumption that the subject being tracked does not move very far from frame to frame, regions classified as potentially part of the subject are included or not included in the updated designated area, depending on their proximity to the previously designated region. Embodiments of the invention employ a spatially varying threshold level to make this discrimination, which is defined with reference to the previously designated region.

Embodiments of the invention include steps of inhibiting the updating of the designated region to prevent excessive growth or shrinkage of the designated region from frame to frame, as might happen for example when another object having the same attributes as the subject moves close to the subject being tracked.

Similarly, updating of the designated region may be inhibited in the event that the updated designated region would include an excessive proportion of regions not classified as potentially part of the subject.

Regions may be classified on a pixel basis, on a block basis, or on a mixture of the two.

Regions may be classified in a graded form for comparison with the previously designated area, and then classified in binary form to define the updated designated region.

Other features which may be advantageous generally or in specific fields of application are disclosed in the specific embodiments described below.

An alternative aspect of the invention provides a method of image processing for tracking a subject in a sequence of image frames, the method comprising:

(a) defining a default position for the subject within each image frame;

(b) obtaining and updating over the sequence of image frames a record of the subject's position in each new frame by reference to predetermined subject identification criteria and also with reference to criteria based on a previous recorded position;

(c) determining whether features satisfying the subject identifying criteria but not the criteria based on previous recorded position are closer to the default position; and (d) if such features are closer, updating the recorded position to refer to such features.

This method finds particular application in a videophone, where the assumption is made that the user of the videophone is sitting centrally in the field of view of the camera. The updating step may be performed subject to a time delay, to avoid returning to the default position in error.

The invention yet further provides methods for encoding motion picture images with limited data rate using the results of subject tracking methods such as are described above. The encoding method may for example be H261 compatible or MPEG compatible.

The invention yet further provides a videophone apparatus including means for encoding image frames as set forth above, a motion picture signal generated by such a method, and a motion picture recording conveying images encoded by such a method.

The invention yet further provides a data processing apparatus wherein elements of a stored regular two-dimensional array are designated active or inactive, the apparatus comprising means for identifying a convex hull, encompassing all active elements of the stored array, including:

(a) means for scanning rows of the array to record the most extreme active element(s) in each row in a linear list; and (b) means for processing the linear list of extreme active elements to identify the desired convex hull without considering further the other less-extreme active elements in each row of the array.

Such an apparatus embodies an efficient method of fitting a convex hull, for example around pixels or blocks which are designate as active in a digitised image frame. The linear list may be ordered by the scanning process, to achieve higher efficiency.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS

For background information in the art of image encoding, many references are available. For the field of videophones in particular, a well known standard H261 has been developed for the efficient coding of digitised moving pictures at a data rate of 64k bits per second. This system, and an experimental setup for encoding videophone images using automatic face tracking techniques are summarised for example in a paper "A Real Time Face Location System to Enhance Videophone Picture Quality" by TIP Trew et al, British Machine Vision Conference Proceedings, 1992, page 488. The contents of that paper and the H261 standard are incorporated herein by reference, although the detail thereof is not necessary for an understanding of the present invention. Another encoding standard suitable for higher bit rates is known as MPEG.

The particular embodiments to be described exploit the fact that the above encoding systems are block based, and perform as much processing as possible at a block level, rather than the more computationally intensive pixel level. Nevertheless, the techniques described herein are not necessarily limited to block-based processing, and can be implemented at the pixel level, if sufficient computational power is available.

The first embodiment is based on an algorithm which first identifies moving areas in the frame, as distinct from uncovered stationary areas, by considering the frame differences over three consecutive frames. If the only moving object were the videophone user (hereinafter referred to as "the subject"), and the videophone camera and ambient lighting intensity remain fixed, the frame difference will contain information only in the regions of the subject and the uncovered background. The conditions, however, are not always ideal; that is, there are other moving objects in the background and the ambient lighting conditions are variable due to, for instance, shadows falling across parts of the field of view. Either of these conditions will generate extraneous motion. This means that the frame difference signal will also contain information relating to these changes in the background. Thus the need arises to somehow differentiate between the changes in the image caused by the subject and those caused by the unwanted effects described above. If it is assumed that the subject will not have moved very far between frames this information can be used towards that end.

For every new frame ($F_k$, comprising for example 352× 288 pixels), the movement information is first extracted and processed into a block format ($M_k$) ready for the higher level processing that forms the main part of the algorithm. This must be sensitive to the movement of areas with little texture, and yet should be immune to camera noise.

Figure 1:
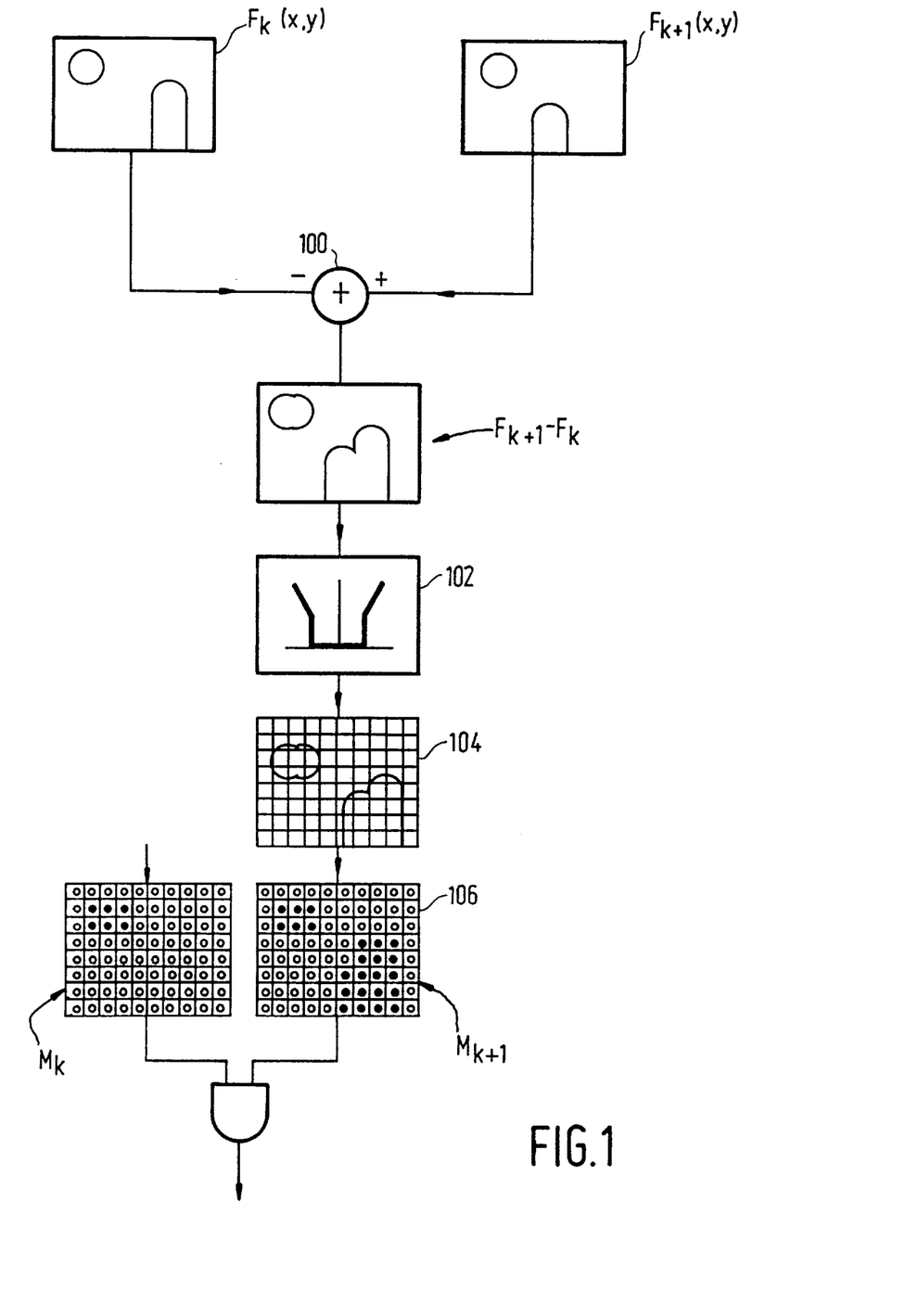
FIG. 1 shows a preprocessing stage for motion detection in a videophone according to the invention.

The pixel-level procedure is described below and summarised in FIG. 1 with a typical $M_k$ shown in FIG. 2. For two frames k−1 and k, the pixel-by-pixel frame difference is calculated at 100.

The magnitude of the frame difference signal is then thresholded at 102. This means that pixels whose frame difference is greater than a certain threshold are designated as having changed while the rest are designated as being unchanged.

$$I_k(x, y) = \begin{cases} 1 & \text{if } |F_k(x, y) - F_{k-1}(x, y)| > T_n, \\ 0 & \text{otherwise.} \end{cases}$$

where:
x,y denote pixel co-ordinates,
$I_k$ is the thresholded frame difference between frames k and k−1,
$F_k$ denotes the kth frame of data in the sequence,
$T_n$ is a threshold level.

The primary reason for this thresholding is to limit the effects of camera noise. A secondary but very desirable effect of this thresholding operation is to disregard slow lighting changes, having an interframe difference below $T_n$. Unavoidably, some movement information generated by the subject and other moving objects will be lost too, but in most cases this will be insignificant.

The thresholded interframe difference $I_k(x,y)$ is then partitioned at 104 into blocks, for which a typical size would be 16×16 pixels, and the number of changing pixels in each block is counted at 106. This is the block based movement information on which the main part of the algorithm operates and will be given the symbol $M_k$ where the subscript k denotes information derived from the interframe difference between frames (k) and (k−1).

$$M_k(i, j) = \sum_{u=0}^{N} \sum_{v=0}^{N} I_k(i + u)(j + v)$$

where:
i,j denote co-ordinates in the block array,
u,v denote co-ordinates within a block,
N is the size of a block side in pixels.

As mentioned above, when an object moves, the frame difference signals contain information in the locations of both the subject and the uncovered background. In order to track the subject reliably it is preferred to discriminate between the two. If the two frame differences derived from a sequence of three frames showing a moving object are considered, it is clear that the information common to both these frame differences will be in the location of the object during the second frame. This means that blocks that are non-zero in both $M_k$ and $M_{k+1}$ will give the locations of moving objects in frame (k−1), while blocks that change from non-zero to zero will represent uncovered background (and those changing from zero to non-zero will represent background covered in frame (k+1)). Thus the locations of moving objects can be identified with a one frame delay through what is essentially an ANDing operation.

Noise can cause blocks to be erroneously designated as being moving objects. Although most of the noise will have been removed by the pixel rate thresholding operation described above, in order to remove the residual effects of noise and simultaneously convert M to a binary format, the contents of M are thresholded giving a binary image of the frame differences. Thus any blocks with a number of changing pixels greater than a threshold $T_m$ are designated as being changing. The result of this thresholding operation is denoted as $M'_k$ and the result of the ANDing operation as $S_k$.

$$M'_k(i, j) = \begin{cases} 1 & \text{if } M_k(i, j) > T_m, \\ 0 & \text{otherwise} \end{cases}$$

$$S_k(i, j) = M'_k(i, j) \, \& \, M'_{k-1}(i, j)$$

With a block size 16×16 pixels, the count $M_k(i,j)$ can range from 0 (no changed pixels) to 256 (all changed), and a threshold $T_m=5$ has been found to give good results in such a case. The $M'_k$ corresponding to the signal shown in FIG. 2 with $T_m=5$ is shown in FIG. 3.

Now, the result of the ANDing operation ($S_k$), as described so far will naturally contain the locations of both the subject and foreign moving objects in frame (k). If it were possible for any one of the operands of the ANDing operation to contain solely information on the movement (i.e. location and uncovered background) of the subject, then $S_k$ would show the location of the subject, disregarding any foreign objects. In order to do this in accordance with the invention a spatially varying threshold, which is hereinafter referred to as a "potential well", has been devised.

Figure 2:
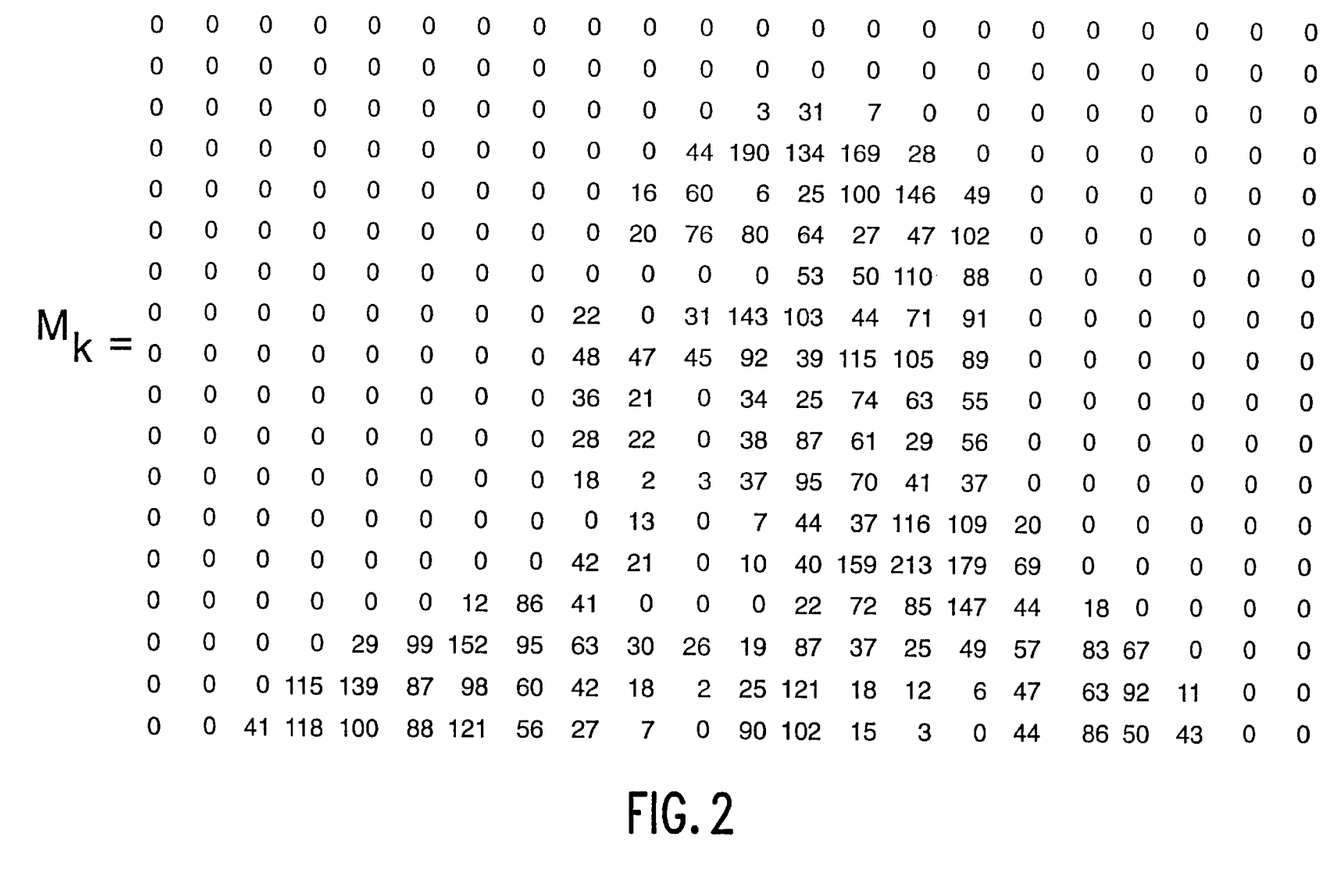
FIG. 2 shows a sample array of changed pixel counts per block generated by the process of FIG. 1.
Figure 3:
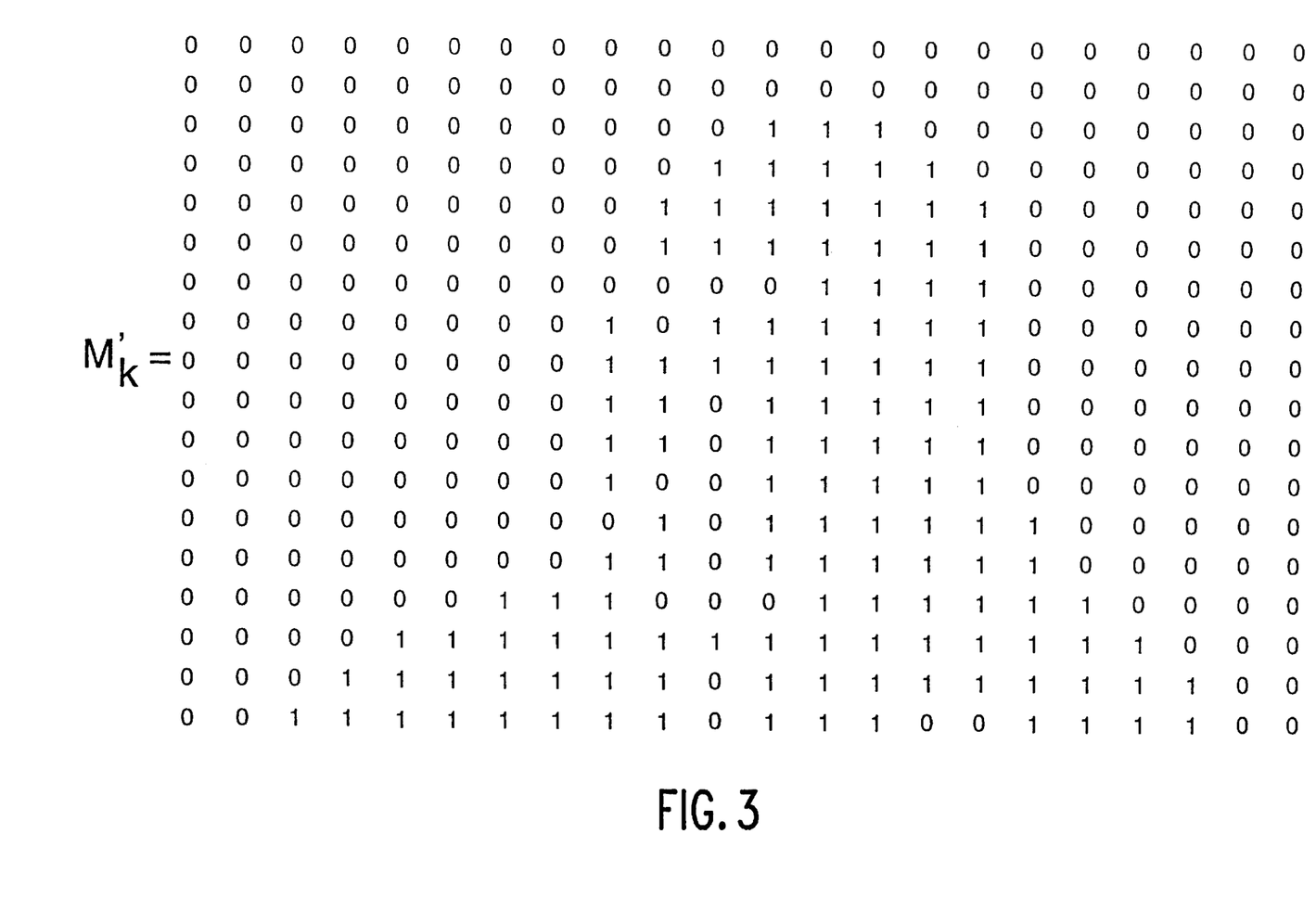
FIG. 3 shows the same array after thresholding.
Figure 4:
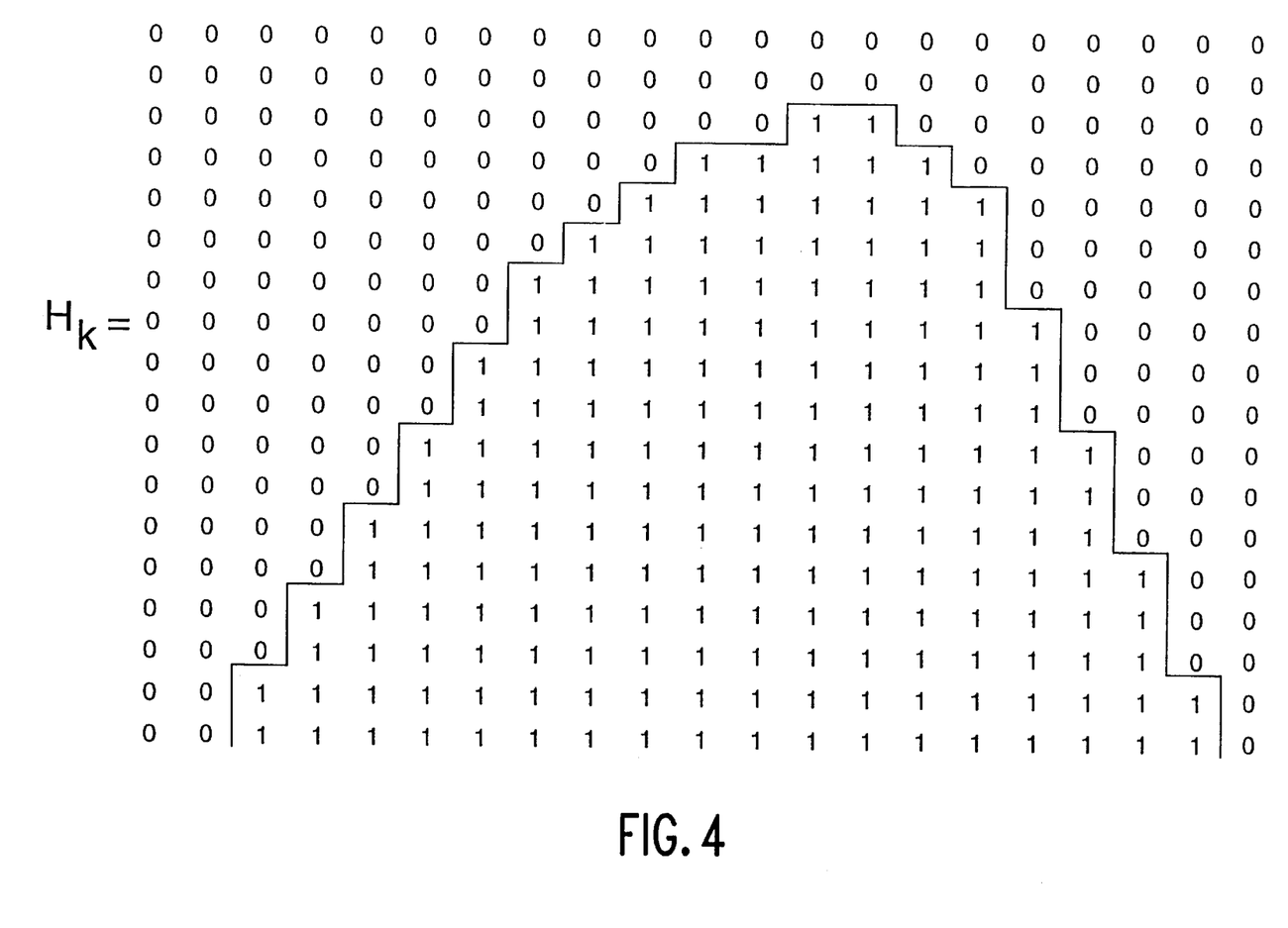
FIG. 4 shows the fitting of a convex hull around the thresholded values of FIG. 3.
Figure 5:
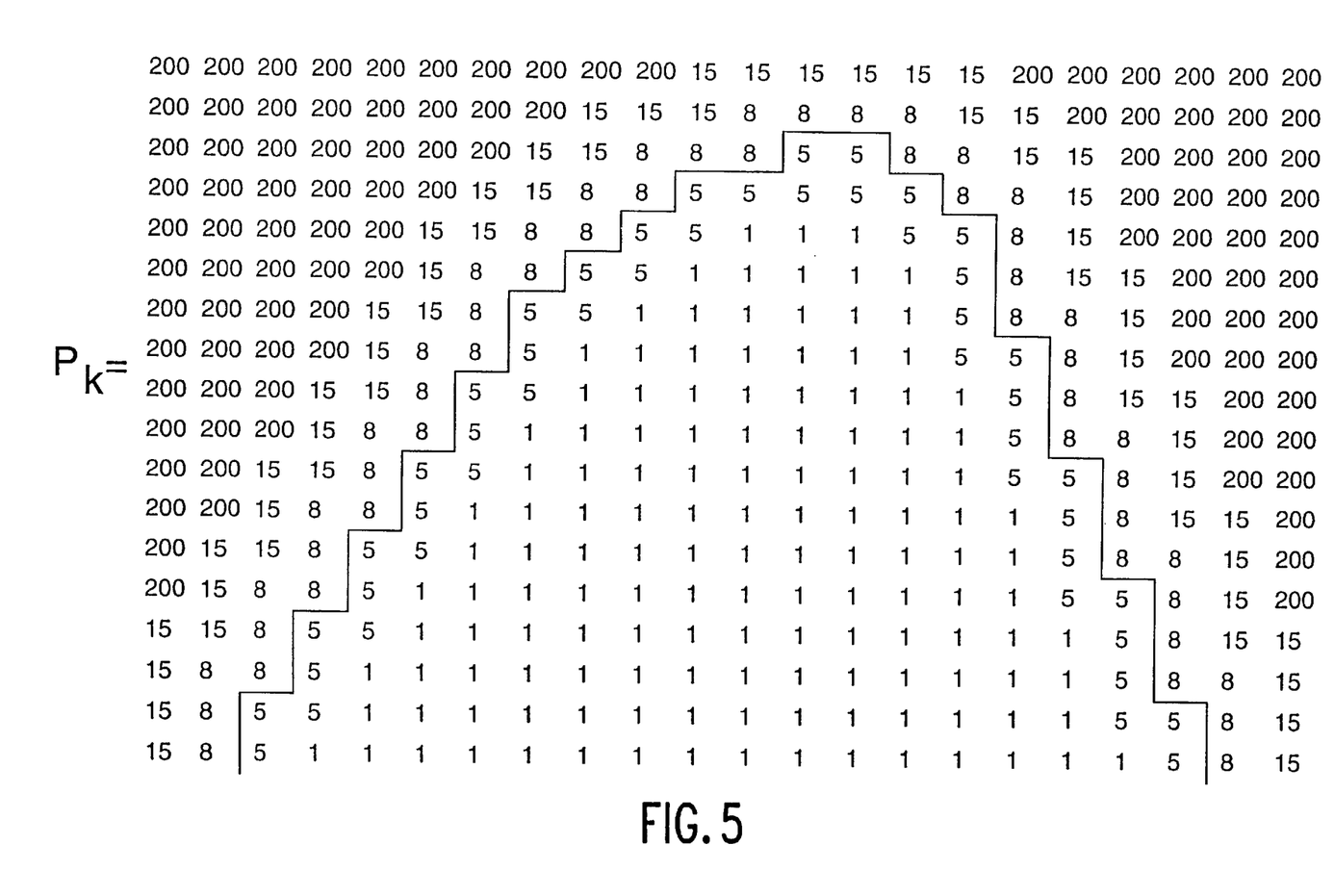
FIG. 5 shows a potential well formed by fitting spatially varying threshold values around the convex hull of FIG. 4.

FIG. 4 shows, for the frame represented in FIGS. 2 and 3, an array $H_k$ identifying the regions (blocks) which are currently designated as belonging to the subject being tracked. FIG. 5 shows an array $P_k$ of threshold values defining the "potential well".

Figure 6:
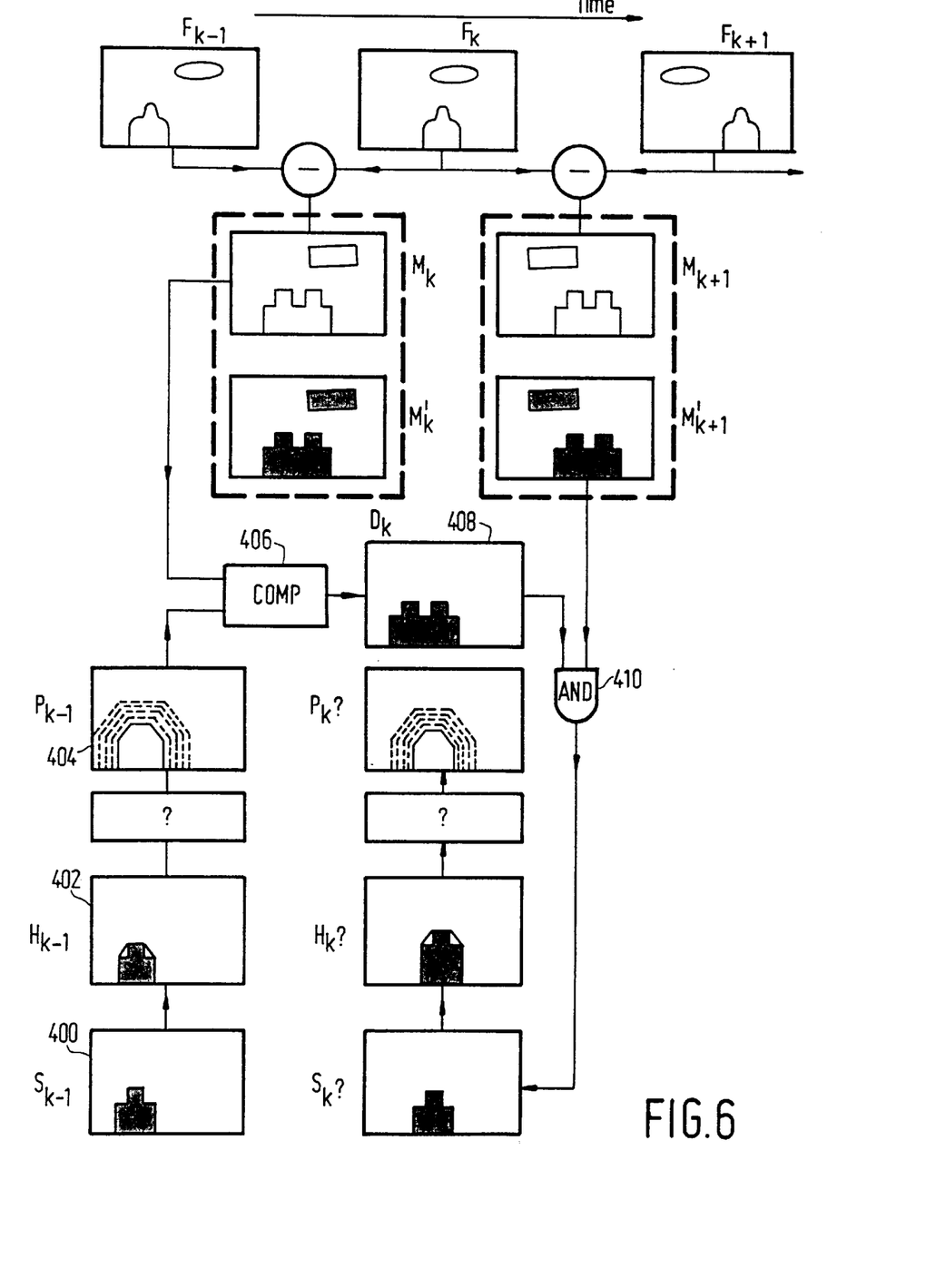
FIG. 6 illustrates the operations performed per frame for subject tracking in the videophone.

The schematic diagram of FIG. 6 summarises the process adopted in one embodiment.

It is first assumed that an array $S_{k-1}$ (stored at 400) identifies only the blocks that form part of the subject's location in previous image frame $F_{k-1}$. How this situation is achieved initially and maintained subsequently will be described later. A convex hull array $H_{k-1}$ (FIG. 4) is then fitted around the subject at 402, and this bounds the floor of a potential well. This potential well array $P_{k-1}$ (FIG. 5) is generated at 404 and consists of a set of thresholds for deciding whether a changing block was caused by the subject's movement or not.

The array of such thresholds fitted around the subject in frame (k−1) is denoted as $P_{k-1}$. As shown in FIG. 5, these thresholds $P_{k-1}(i,j)$ increase for blocks further away from the convex hull in frame $F_{k-1}$. A decision is made at 406 by comparing each element $M_k(i,j)$ (representing the number of changing pixels in block (i,j)) with the corresponding element $P_{k-1}(i,j)$ of $P_{k-1}$ (the corresponding value of the potential well for that block). Those blocks whose changing pixels exceed the potential well threshold (and therefore are close to the subject) are designated as being part of the moving subject. Those blocks which contain movement but do not exceed the potential well threshold (because they are relatively distant from the subject) are designated as being part of a foreign moving object.

It may be noted that in the example the value of the potential well threshold $P_k(i,j)$ is only one within the convex hull itself. This value is less than the noise threshold $T_m$ which is used to obtain $M'_k$, meaning that the regions which are very likely to form part of the subject being tracked are also extremely sensitive to noise. It has been found in practice that, in areas of a subject that lack texture or contrast, this noise sensitivity can actually aid the tracking process.

Methods of convex hull fitting are known, although one novel method will be described later. The steepness of the potential well will determine how well the algorithm responds to movement: if the sides are made too steep there is a danger that if the subject moves too quickly it will overshoot the potential well and part of it will be designated as a foreign object. As an improvement to reduce this problem, the position of the convex hull can be modified by motion prediction, based on the movement observed between the previous two frames.

Thus the potential well is used to discriminate between changing blocks that are attributed to the subject and other changing blocks. The comparison at 406 gives a block map 408 of changes in the subject only which is given the symbol $D_k$. This is used instead of $M'_k$ in the ANDing operation (at 410) with $M'_{k+1}$, yielding an array $S_k$ that ideally contains only the subject's position in frame (k). $S_k$ can then be used to define a new convex hull $H_k$ and potential well $P_k$, which in turn can be used to track the subject as it moves in frame $F_{k+1}$, and so on.

$$D_k(i, j) = \begin{cases} 1 & \text{if } M_k(i, j) > P_k(i, j), \\ 0 & \text{otherwise} \end{cases}$$

$$S_k(i, j) = D_k(i, j) \, \& \, M'_{k-1}(i, j)$$

Other Embodiments

As noted in the introduction, the presence of motion is not the only means of tracking a subject, and in general image processing (as opposed to videophone applications), motion detection will not generally be suitable for tracking an object, since the camera position itself is not fixed and the entire scene may include motion. The pre-processing stages of the process illustrated in FIG. 6 can readily be adapted to implement any classifying process, which can then be used to update the designated region and the potential well which is used to track the subject further.

As a particular example, a specific subset of colour space, and in particular chrominance space, can be identified which includes colours typical of the subject to be tracked. Conditional probabilities can then be established, so that, for a pixel having a given colour, a probability can be evaluated the that pixel is part of the subject being tracked. Colours which tend to appear equally in the background and the subject being tracked will be assigned a neutral probability value, while colours which tend to occur only in the subject being tracked will be assigned a very high probability value. For each new frame, it is then simple, to arrive at an array of probability values per pixel, or per block, which can be used in place of the array $M_k$ in comparison with the potential well array $P_{k-1}$. Of course in non-motion based embodiments, the ANDing process becomes unnecessary, and there is no distinction between the arrays $D_k$ and $S_k$ shown in FIG. 6.

Figure 7:
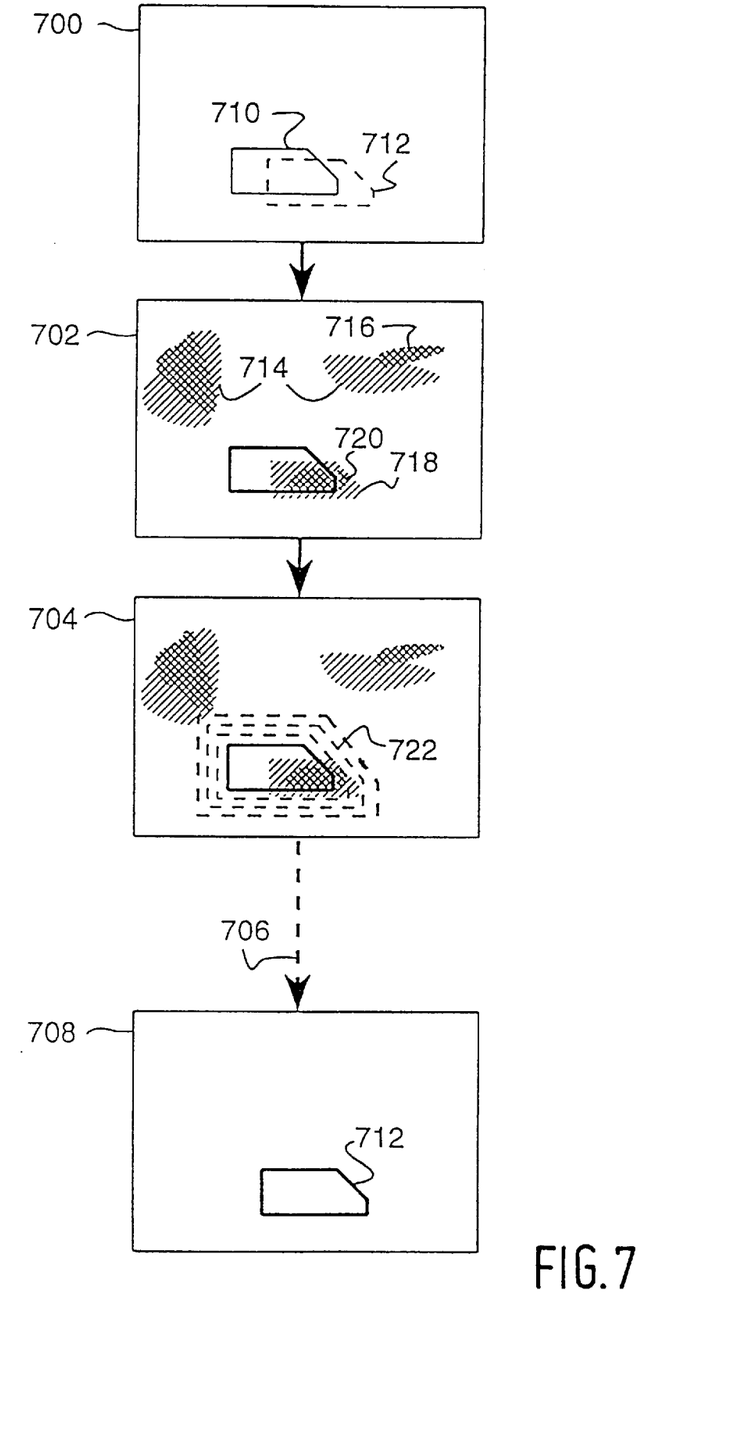
FIG. 7 illustrates the operation of subject tracking in a chrominance-based embodiment used in the encoding of general motion picture sequences.

FIG. 7 illustrates in steps 700 to 708 the general tracking process as outlined above. In step 700, the region previously designated as including the subject to be tracked is shown at 710. A new position of the subject is shown dotted at 712.

In step 702, the pixel values of a new frame are classified to determine the probability that each pixel or block of the new image might be part of the subject being tracked. In particular, the chrominance of each pixel is compared with a probability distribution table, to identify colours which have a high probability of belonging to the subject being tracked. Pixels (or blocks) having a fair probability of belonging to the subject being tracked are shown with diagonal hatching at 714 and 718. Regions (pixels or blocks) showing a very high probability of belonging to the subject are shown with cross-hatching, for example at 716 and 720. In the present embodiment, these probabilities are based on a chrominance distribution as described. In a videophone embodiment operating on the basis of detected motion, the cross-hatched areas can correspond to blocks with a lot of motion, with the more lightly shaded areas corresponding to blocks with moderate motion.

It will be appreciated that the areas 714 and 716, although containing colours appropriate to the subject being tracked are in fact caused by foreign objects also represented in the image frame. Regions 718 and 720, on the other hand, truly belong to the object being tracked.

Step 704 illustrates how the use of the potential well 722, defined on the basis of the previously designated region 710, can be used to discriminate between the regions which are part of the subject being tracked and regions which are not. Specifically, regions 718 and 720 fall within the low threshold part of the potential well 722, and through the comparison step (406 in FIG. 6) are able to contribute to the definition of an updated designated region. Regions 714 and 716, on the other hand, fall in the very high threshold region of the potential well 722 and are unable to influence the updating of a designated region.

Subject to certain conditions at step 706, which will be described below, the regions which pass the potential well test are used at step 708 to define the updated designated region 712, now shown in solid lines.

Conditional Update

Returning to the context of a motion-based videophone, two problems that arise in the embodiments as described so far are: (i) when the subject is motionless, the technique as described so far would lose track of it and (ii) in the cases when there are moving foreign objects behind the subject, the algorithm might incorporate them into the region designated by $S_k$ as the subject, thus causing to the designated region to grow.

Figure 8:
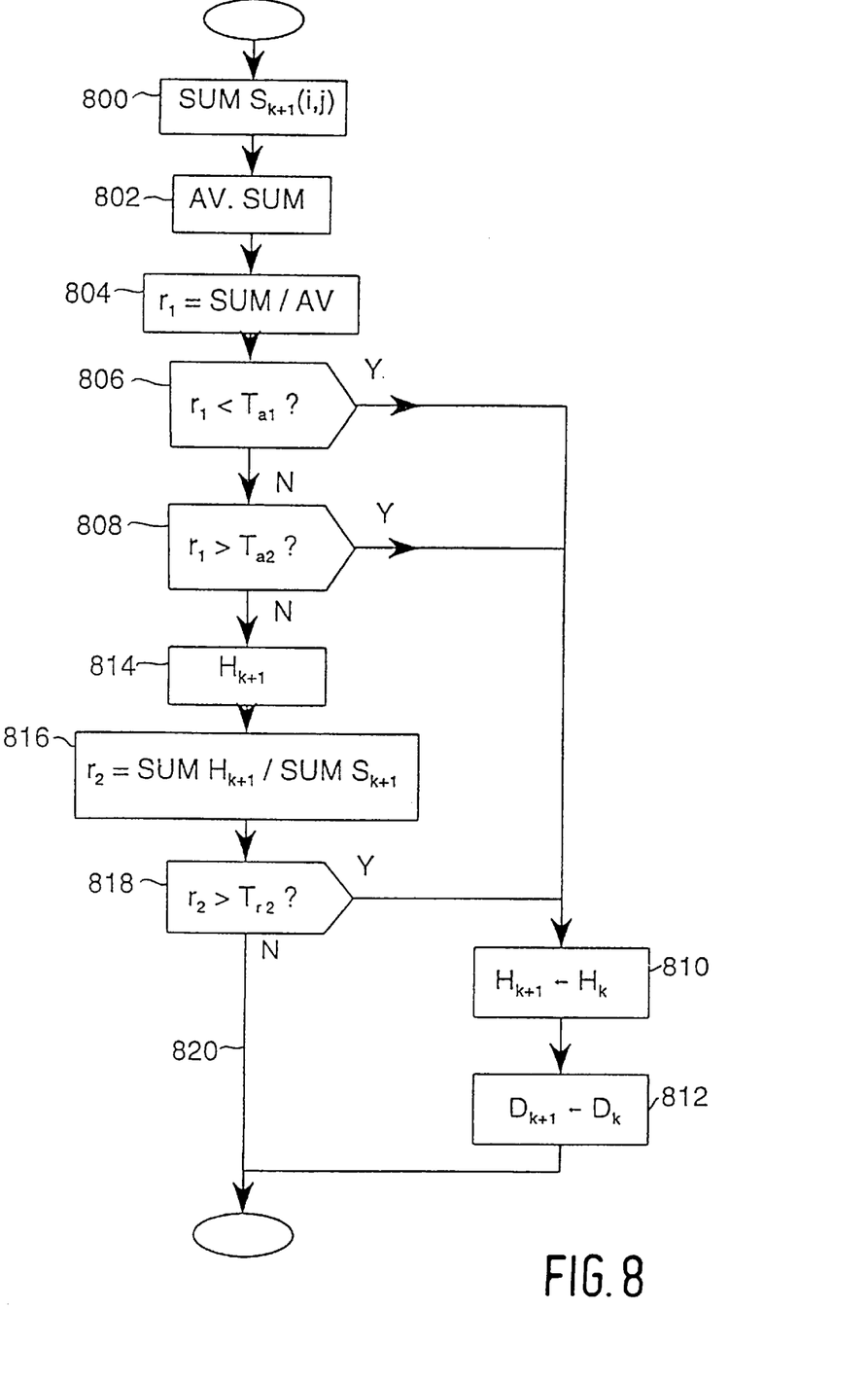
FIG. 8 shows a conditional update method as applied in the process of FIGS. 1–6 or FIG. 7.

FIG. 8 shows how these problems can be counteracted, in particular in that the potential well and the active regions array $D_k$ are not updated for each new frame, unless certain conditions are met at step 706 (FIG. 7).

Specifically, for each frame, the total active area of the subject in $S_k$ is calculated at 800 and passed into a time-averaging filter (step 802). The filter taps are separated by one frame delay and their weights (coefficients) are normalised so that their sum is equal to unity. A division is then performed at step 804 to form a ratio $r_1$ of the subject's current area to its weighted time average area. If $r_1>1$, the subject's active (moving) area is increasing compared to recent frames, possibly because the subject is being merged with a moving object in the background. Equally, if $r_1<1$ it means that the subject's moving area is declining, which may be because the subject has stopped moving.

Thresholds $T_{a1}$ and $T_{a2}$ can be defined (for example 0.9 and 1.1 respectively) within which normal operation occurs. When these thresholds are violated (tested at steps 806 and 808) the algorithm does not update the designated region. In that case (step 510) the convex hull and potential well are not fitted around the new $S_k$, $D_k$ is not updated (step 812) and the subject's area data is not allowed to propagate through the filter (step 802). The wider the range between these thresholds, the more flexibility is permitted. As the subject may not be a rigid object, some flexibility is necessary to allow it to turn, move towards or away from the camera, etc. If the thresholds are assigned too generous values, however, the process will become unstable, losing track of the subject when it becomes still, or incorporating foreign objects into the area it believes to be occupied solely by the subject.

The length (in frame periods) of the filter implemented at step 804 will determine how long the algorithm retains a record of the subject's area. Its impulse response will determine how quickly the process can respond to rapid changes in area: if the most recent inputs are weighted most heavily, the bandwidth of the filter will increase, making it more responsive to rapid changes.

Assuming that the area test is satisfied, a prospective updated convex hull $H_{k+1}$ is calculated at step 814. The area filter's primary function is to enable the process to keep track of the subject when it does not move, although it serves equally well to restrict rapid growth of the area of $S_k$. However, the stability imposed by the filter on S in many cases is not enough to prevent S from growing out of control when foreign objects are moving close to the subject. Thus, another test is employed in this embodiment to further control the conditions under which the process updates the designated region. This second test involves forming at 816 the ratio $r_2$ of the area inside the convex hull H to the moving area in S (i.e. the input to the area filter), both measured in numbers of blocks. When the area filter thresholds $T_{a1}$ and $T_{a2}$ are not violated, this ratio $r_2$ is compared at 816 to another threshold $T_{r2}$ and the process only updates the designated region if this threshold is not exceeded.

The reasoning behind the test on $r_2$ is that in many cases where a foreign object was mistakenly thought to be part of the subject, the two objects are only connected by a narrow isthmus, so that when the algorithm fits a convex hull H around the "active" regions in S, there will be many "holes" of background within the convex hull. This leads to $r_2>T_{r2}$, causing the algorithm not to update. Thus, $r_2$ can be thought of as a measure of "compactness" of the subject and the potential well will only be updated (path 820) if the subject is reasonably compact. Trials show that values of $T_2$ in the region of 1.5 work well.

It will be appreciated that, while the above description of FIG. 8 refers to moving regions and motion as the criterion for judging that regions are likely to form part of the subject being tracked, the same test for conditional updating can be applied whether the "active regions" identified in array S are determined by reference to motion, chrominance, colour or any other classification criterion. Whereas, in a motion-based embodiment, the second area filter test at step 808 is useful to accommodate the situation where a moving subject suddenly becomes still for a period of time, in a colour-based embodiment the same test is effective in situations where the subject is temporarily obscured by an object of a different colour.

INITIALIZATION

At startup, the device will have no knowledge of the subject's position. For the videophone application, it can be instructed to look for the subject in a specific area of the screen by specifying the contents of $D_0$, as this is ANDed with any movement in the screen to give $S_0$. The AND result $S_0$ will be flawed as it will be the union of the subject's position at both frames 0 and 1, but is an adequate approximation. By way of example, this initial search area may be defined to be the centre half of the screen. The normal process operation (described above) can be started when the number of active (changing) blocks in this search area exceeds twenty, for example.

Furthermore, until normal operation starts:

i) the potential well thresholds within the convex hull are raised to a level that is slightly above that required to counteract the effects of noise, in order to ensure that noise does not prevent the process from locking on to the subject quickly and correctly, ii) the area filter is disabled by having all its taps loaded with the current changing area (sum over $S_k$), thereby ensuring that $T_{a1}$ and $T_{a2}$ are not violated, iii) the process is only allowed to update the designated region when $r_2$ is smaller than its previously smallest value. This feature is designed to ensure that the algorithm starts searching for the subject in the entire area specified in $D_0$ and then gradually converges upon the subject.

In tests it was found that the algorithm locked on to the subject in approximately three frames.

For general tracking of a subject in a motion picture sequence, for example in the field of generating digital video recordings from cinema films, an alternative initialisation procedure might be more suitable, in which the user manually outlines the subject to be tracked in the first image frame of the relevant sequence. The skilled person will readily appreciate how this can be implemented in a digital video editing environment. Moreover, the reader will appreciate that in such an embodiment the criteria for judging whether a pixel or block is potentially part of the subject to be tracked can be defined automatically by the apparatus, by comparing the statistics (colour distribution or whatever) of the manually designated region with the statistics of the image frame as a whole. Given that the manually designated region is known from the outset to be the region containing subject, the measures (i) to (iii) above need not be applied, as normal operation can commence immediately.

Error Recovery—"Return to Centre"

Figure 9A:
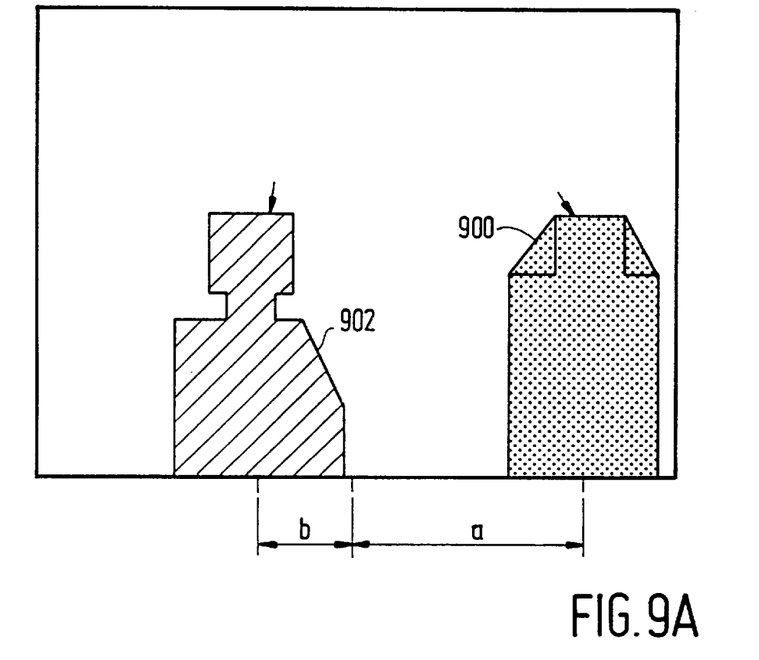
FIG. 9 illustrates a "return to centre" behaviour in the subject tracking of the videophone.
Figure 9B:
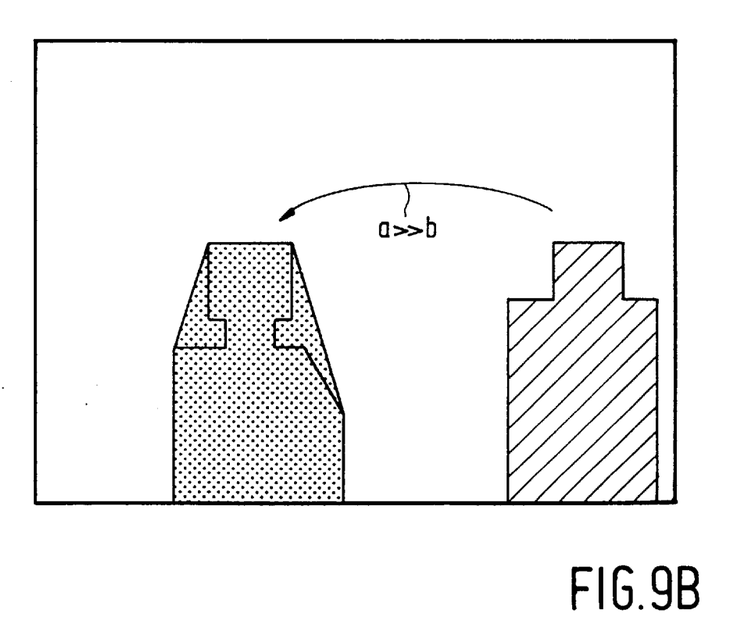

Inevitably there will sometimes be errors when the process loses track of the subject and locks onto a foreign object. In order to allow recovery in such circumstances a "return to centre" feature may be added, as illustrated in FIGS. 9A and 9B.

For each frame, the apparatus calculates the mean distances from the centre of the horizontal axis, first of the blocks encircled by the convex hull (shown for example at 900 in FIG. 9A) and secondly of the blocks designated as belonging to foreign objects (902). If the former distance "a" is greater than the latter distance "b" by a substantial number of blocks, it means that there is a foreign object much closer to the centre than the object currently designated as being the subject.

In such cases the apparatus may be programmed to assume that the subject is, in fact, the object 902 at the centre of the screen and that somehow a mistake has occurred causing it to lock onto a foreign object (900). Then, the moving object at the centre of the screen will be designated as the subject and will have a convex hull and potential well fitted around it, while the object which was previously designated to be the subject is redesignated to be a foreign object. The changed situation is illustrated in FIG. 9B.

This feature is also effective as a general "reset" when, for example, the subject moves out of the field of view of the camera, or if someone else wishes to use the videophone during the same conversation: in cases of dispute the algorithm will choose to track the object closest to the centre of the screen. To prevent the system from switching subjects erroneously an extra safety feature of a time delay can be added before switching to track a more central object.

Selection of Region for Enhancement

Since videophones and digital video systems such as MPEG operate at a fixed mean data rate, the enhancement of picture quality of the subject is achieved at the expense of that of the background. This is done by diverting information (bits) from the background to the area of interest and the tracking process allows the area to be enhanced to be restricted. For a videophone application, further restriction is possible if the head can be localized within the subject's silhouette. The region to be enhanced must of course also be aligned with block boundaries.

One simple method for locating the subject's head is by placing a rectangle at an offset from the centre of gravity of the convex hull. Both the dimensions of this rectangle and its offset from the centre of gravity are selected automatically according to the total area of the convex hull. This helps to ensure that the smallest adequate region of enhancement is maintained in order to get the greatest benefit possible from the enhancement.

Extracting the Convex Hull

The following describes a fast algorithm used to extract the convex hull of a set of points in a two-dimensional array of discrete locations (e.g. a digitised image). The convex hull will be extracted as a set of vertices. The algorithm can be shown to have a maximum computational cost of the order of $2m^2$ where m is the smallest dimension of the array, irrespective of the number of points in the set that is to be bounded. In most cases the computational complexity will be substantially less.

The smallest dimension of the array is first selected. Let us assume that this is the vertical direction and that this comprises m rows. The rightmost points of the set to be bounded are selected by scanning each row from the top to the bottom of the array. The co-ordinates of these points are placed sequentially in a one dimensional array A. This is repeated for the leftmost points but this time scanning from bottom to top, and these points are appended to A. Thus the clockwise circumference of the set of points to be bounded will be held in A, which in turn will have a maximum number of elements 2m.

The algorithm then proceeds as follows:

1. Select the first element as a PIVOT. Define the bearing of a vector as the angle that this vector makes with the upwards pointing vertical axis.

2. Calculate the bearings of the vectors from the pivot to each point in a position further down the array A. Then select the point in the array A whose vector from the pivot has the smallest bearing. Define this to be the LANDING POINT. To avoid having to calculate ARCTANs to do this, we can consider the slope that the vectors make with the axis of smallest dimension (defined to be the vertical axis in this case) and add the appropriate offset according to the signs of the vector components to take into consideration the quadrant in which the vector lies. If two points in A have the same bearing, the one with the greatest array index (the one furthest away in the array A from the pivot) is selected to be the landing point.

3. If the landing point is not the last point in the linear array A, designate the landing point to be the next pivot and proceed from step 2.

When the landing point is also the last point in A (which will necessarily be on the convex hull), the pivot points will define the vertices of the convex hull.

Caution must be taken in case a row in the two dimensional image has only one point which is in the set of points to be bounded. In this case, this point will appear twice in the array. To avoid such errors the (k+1−i)th point must be ignored if it happens to have the same horizontal co-ordinate as the ith point (the vertical co-ordinates will necessarily be identical as these two points will be on the same row).

Let us denote the pivot point and landing point co-ordinates as $(x_p, y_p)$ and $(x_1, y_1)$ respectively. Then we can use equation A.1 in order to find the co-ordinates of every point $(x_c, y_c)$ on the line segment of the convex hull between the pivot and landing points:

$$x_c = x_p + s(y_c - y_1) \quad (A.1)$$

where:

$y_c$ takes values between $y_p$ and $y_1$, and s is the slope that the vector from the pivot to the landing point makes with the axis of the smallest dimension (in this case the vertical axis).

This convex hull extracting algorithm owes its speed to two factors, firstly there is the pre-processing: instead of considering the whole set of points to be bounded we only consider two from each row. During trials of the face location algorithms it has been found that the subject comprised approximately 120 blocks, whilst the convex hull extracting algorithm was only considering 18 or 20 blocks in the linear array A.

The second source of computational saving comes from the ordering in the linear array A and the pivoting action: during the search for the next pivot, the algorithm need only consider the points in the A array with a greater index number than the pivot. Therefore, if the convex hull can be defined by a small number of vertices compared to the number of points in A, the number of bearing calculations will be small.

An alternative algorithm to find the convex hull is the Graham Scan (see R. Sedgwick, "Algorithms", p.326, Addison-Wesley, 1983), which can be used with a few modifications.

This algorithm relies on forming a closed polygon from all the points in the set to be bounded. It then considers each side of this polygon as a line segment and, using this information, decides which points form part of the convex hull and which are bounded by it. Thus, the Graham Scan can be used on the points in A, which are already in the required closed polygon form. The computational complexity of the convex hull algorithm after the preprocessing will be on the order of 2m.

Implementation

The implementation of the above embodiments requires frame differences or chrominance probabilities, to be taken at pixel rates which, in turn, requires a full size frame storage buffer. Subsequently, however, most operations are carried out at block-level resolution on binary data. Thus the storage requirements are small.

The computationally intensive part of the process is that which has to be done at pixel rates, and specialised image processing hardware of conventional design can be employed. Of the higher level processes running at block rate, the most computationally intensive parts are the fitting of the convex hull and the potential well around S. Fortunately a fast algorithm for convex hull extraction is described above, and the potential well is only fitted when there is enough change to warrant an update. The area filter operations are very straightforward and the rest of the computations are mostly logical or comparative operations which are relatively easy to carry out.

In the embodiments which rely on a number of changing pixels per block for movement detection, it is important that the system's camera or other video source is not too noisy. As mentioned above, the apparatus has a substantial amount of built-in noise immunity, but once this is overcome the noise would cause the performance to degrade rapidly.

Another very important factor to the performance of the tracking process is the amount of contrast in the images, when the process depends on frame differences. If there is little contrast, even large movements will not cause a great deal of information to be contained in the frame differences and thus the system's tracking ability will be impaired. Lack of contrast can stem from various sources such as the camera, miscalibration of the system's ADCs or even the ADCs having insufficient dynamic range and causing clipping. This last point becomes a serious problem in extreme ambient lighting conditions (i.e. too bright).

While the invention has been described chiefly in the context of tracking the head of a videophone user it is equally appliable to the tracking of any other object of interest and to systems other than videophones, for example when coding video signals for interactive media applications using coding systems such as MPEG. In the transfer of cine films to digital Compact Disc, for example, the process described above based on chrominance probability distributions has been shown to be effective in tracking the principle subjects of a scene, so as to increase the number of costs allocated to blocks falling within the designated region. Clearly, for general image processing the tracking achieved by the above processes is for superior to tracking based on motion or chrominance alone.

What is claimed is:

1. A method of image processing for tracking a subject in a sequence of image frames using defined criteria for classifying image regions as potentially being part of the tracked subject, the method comprising the steps of:

(a) obtaining, for a first image frame, a record of an image region previously designated as containing the tracked subject;

(b) classifying, in graded form, image regions of a second image frame in accordance with the defined criteria to thereby generate classified image regions, (c) defining a spatially varying threshold level with reference to the previously designated image region; and (d) updating said designated image region associated with said second image frame with reference to both said classified image regions in said second image frame and the previously designated image region in said first image frame, excluding image regions whose classification grade is below the spatially varying threshold level from the updated designated image region.

2. The method as recited in claim 1, wherein said image regions classified as potentially part of the tracked subject are included or not included in the updated designated image region, depending on their proximity to the previously designated image region.

3. The method as recited in claim 1, wherein the updated designated image region is defined as a convex hull with reference to all of said image regions which are to be included.

4. The method as recited in claim 1, wherein the step of updating said designated image region is automatically inhibited to prevent excessive growth of said designated image region, said excessive growth being growth beyond a predetermined factor.

5. The method as recited in claim 4, wherein growth in area of said designated image region is judged excessive or not by comparison with an area value averaged over a number of previous image frames.

6. The method as recited in claim 1, wherein the step of updating said designated image region is automatically inhibited to prevent excessive shrinkage of said designated image region, said excessive shrinkage being shrinkage below a predetermined factor.

7. The method as recited in claim 6, wherein shrinkage in area of said designated image region is judged excessive or not by comparison with an area value averaged over a number of previous image frames.

8. The method as recited in claim 1, wherein the step of updating said designated image region is automatically inhibited in the event that the updated designated image region would include an excessive proportion of image regions not classified as potentially part of the tracked subject, said excessive proportion being a change in proportion beyond a predetermined factor.

9. The method as recited in claim 1, wherein motion of the tracked subject or designated image region is detected over successive image frames, and wherein updating of said designated image region in the updating step is performed with reference to the classified image regions in the second image frame, the previously designated image region and a predicted degree of motion with respect to the tracked subject.

10. The method as recited in claim 1, wherein each new image frame is divided into blocks of pixels and the classifying step is performed on a block-by-block basis.

11. The method as recited in claim 10, wherein the pixels of the first and second image frames are classified individually and the classification for each block is obtained by combining the classifications of the pixels within the block.

12. The method as recited in 11, wherein individual pixels are classified in binary form and the classification of each block is perturbed by counting pixels within each block meeting a pixel classification criteria.

13. The method as recited in claims 10, 11, or 12, wherein blocks are classified in binary form.

14. The method as recited in claim 1, wherein the defined criteria permit classification of moving objects as potentially part of the tracked subject.

15. The method as recited in claim 1, wherein the defined criteria for each of said image regions includes whether a pixel value or values of said image region in the second image frame is different from the corresponding pixel value of said first image frame.

16. The method as recited in claim 15, wherein for the classifying step, pixel differences below a predetermined noise threshold are disregarded.

17. The method as claimed in claims 15 or 16, wherein the classifying step includes a substep of discriminating between changes representing movement of the tracked subject and changes representing uncovering of background.

18. The method as recited in claim 17, wherein:
two successive comparisons are performed over three successive image frames, and
changes are disregarded for image regions which do not change in both comparisons.

19. The method as recited in claim 1, wherein the classifying criteria for each of said image regions includes whether a pixel value or values of said image region in said second image frame fall within a predetermined subset of possible pixel values.

20. The method as recited in claim 19, wherein said predetermined subset is determined automatically by probability analysis of pixel values present in a designated image region when compared with said respective image frame as a whole.

21. The method as recited in claims 19 or 20, wherein said predetermined subset of possible pixel values is defined with reference to the chrominance characteristics of the tracked subject.

22. The method as recited in claim 1, wherein a default designated image region is defined for the start of the sequence of image frames.

23. The method as recited in claim 22, wherein updating of the default designated image region is inhibited until a significant area within said designated image region is classified as potentially part of the tracked subject.

24. The method as recited in claim 1, wherein an initial designated image region for the sequence of image frames is defined by manual input.

25. The method as recited in claim 24, wherein the criteria used in the classifying step are defined automatically with reference to the initial designated image region.

26. The method as recited in claim 1, wherein said steps (a) through (d) comprise a routine for encoding motion picture image frames using a limited data rate, wherein image quality is enhanced for an image region designated as including the tracked subject, and wherein said designated image region is updated for the tracked subject using the steps (a) through (c).

27. The method as recited in claim 26, wherein said limited data rate is allocated on a block basis, and wherein said designated image region is updated in corresponding block units.

28. The method as recited in claims 26 or 27, wherein the encoding is H261 compatible.

29. The method as recited in claims 26 or 27, wherein the encoding is MPEG compatible.

30. The method as recited in claim 1, wherein the updating step is performed subject to a time delay defined with respect to a frame period.

31. The method as recited in claim 1, wherein steps (a) through (d) comprise a routine for encoding motion picture image frames using a limited data rate, wherein image quality is enhanced for the image region designated as including the particular tracked subject, and wherein said designated image region is updated for the tracked subject using the steps (a) through (d).

32. The method as recited in claim 31, wherein said limited data rate is allocated on a block basis, and wherein said designated image region is updated in corresponding block units.

33. The method as recited in claims 31 or 32, wherein the encoding is H261 compatible.

34. The method as recited in claims 31 or 32, wherein the encoding is MPEG compatible.

35. A videophone apparatus including a camera and means for encoding image frames output by the camera by the method recited in claims 26 or 31.

36. A motion picture signal generated by the method as recited in claims 26 or 31.

37. A motion picture recording conveying images encoded by a method as recited in claims 26 or 31.

38. A data processing apparatus wherein elements of a stored regular two-dimensional array are designated active or inactive, the apparatus comprising:
means for identifying a convex hull encompassing all active elements of the stored array, said identifying means including:
(a) means for scanning rows of the array to record the most extreme active element(s) in each row in a linear list; and
(b) means for processing the linear list of extreme active elements to identify the desired convex hull without considering further the other less-extreme active elements in each row of the array.

39. A method of image processing for tracking a subject in a sequence of image frames using a defined criteria for classifying image regions in said image frames as potentially being part of the tracked subject, the method comprising the steps of:

(a) for a first image frame, designating an image region containing the tracked subject as a designated image region, (b) classifying image regions within said designated image region using the defined criteria;

(c) obtaining a first record of said designated image region;

(d) for a subsequent second image frame, obtaining a second record of said second image frame corresponding to the previously designated image region;

(e) classifying, in graded form, image regions of said second image frame in accordance with the defined criteria;

(f) defining a spatially varying threshold with reference to the previously designated image region, and (g) updating said designated image region with reference to both the classified image regions in said second image frame and to the first record, excluding image regions whose classification grade is below the spatially varying threshold level from the updated designated image region.

40. The method as recited in claim 39, wherein said image regions classified as potentially part of the tracked subject are included or not included in the updated designated image region, depending on their proximity to the previously designated image region.

41. The method as recited in claim 39, wherein the updated designated image region is defined as a convex hull with reference to all of said image regions which are to be included.

42. The method as recited in claim 39, wherein the step of updating said designated image region is automatically inhibited to prevent excessive growth of said designated image region, said excessive growth being growth beyond a predetermined factor.

43. The method as recited in claim 39, wherein the step of updating said designated image region is automatically inhibited to prevent excessive shrinkage of said designated image region, said excessive shrinkage being shrinkage below a predetermined factor.

44. The method as recited in claim 39, wherein the step of updating said designated image region is automatically inhibited in the event that the updated designated image region would include an excessive proportion of image regions not classified as potentially part of the tracked subject, said excessive proportion being a change in proportion beyond a predetermined factor.

45. The method as recited in claim 39, wherein motion of the tracked subject or designated image region is detected over successive image frames, and wherein updating of said designated image region in the updating step is performed with reference to the classified image regions in the second image frame, the previously designated image region and a predicted degree of motion with respect to the tracked subject.

46. The method as recited in claim 39, wherein each new image frame is divided into blocks of pixels and the classifying step is performed on a block-by-block basis.

47. The method as recited in claim 39, wherein the defined criteria permit classification of moving objects as potentially part of the tracked subject.

48. The method as recited in claim 39, wherein the defined criteria for each of said image regions includes whether a pixel value or values of said image region in the second image frame is different from the corresponding pixel value of said first image frame.

49. The method as recited in claim 39, wherein the classifying criteria for each of said image regions includes whether a pixel value or values of said image region in said second image frame fall within a predetermined subset of possible pixel values.

50. The method as recited in claim 39, wherein a default designated image region is defined for the start of the sequence of image frames.

51. The method as recited in claim 39, wherein an initial designated image region for the sequence of image frames is defined by manual input.

52. The method as recited in claim 39, wherein said steps (a) through (f) comprise a routine for encoding motion picture image frames using a limited data rate, wherein image quality is enhanced for an image region designated as including a particular tracked subject, and wherein said designated image region is updated for the tracked subject using the steps (a) through (f).

* * * * *